US012483451B2

(12) United States Patent
Yu

(10) Patent No.: US 12,483,451 B2
(45) Date of Patent: Nov. 25, 2025

(54) TRANSCEIVER CIRCUIT AND ASSOCIATED CONTROL METHOD

(71) Applicant: Realtek Semiconductor Corp., HsinChu (TW)

(72) Inventor: Tsung-Nan Yu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 18/660,256

(22) Filed: May 10, 2024

(65) Prior Publication Data
US 2024/0406043 A1 Dec. 5, 2024

(30) Foreign Application Priority Data
May 29, 2023 (TW) .................. 112119850

(51) Int. Cl.
*H04B 1/40* (2015.01)
*H04L 27/00* (2006.01)

(52) U.S. Cl.
CPC ........... *H04L 27/0014* (2013.01); *H04B 1/40* (2013.01); *H04L 2027/0024* (2013.01)

(58) Field of Classification Search
CPC ........ H04L 27/0014; H04L 2027/0024; H04B 1/40
See application file for complete search history.

(56) References Cited

U.S. PATENT DOCUMENTS

| 2005/0272397 A1 | 12/2005 | Sowlati |
| 2010/0105344 A1 | 4/2010 | Guo |
| 2020/0212845 A1 | 7/2020 | Chan |
| 2023/0129287 A1* | 4/2023 | Koppassery ........ H03F 3/45475 330/261 |

OTHER PUBLICATIONS

Kim, "A Complex Band-Pass Filter for Low-IF Conversion DAB/T-DMB Tuner with I/Q Mismatch Calibration", IEEE Asian Solid-State Circuits Conference, Nov. 3-5, 2008.
Xu, "Power-Scalable, Complex Bandpass/Low-Pass Filter With I/Q Imbalance Calibration for a Multimode GNSS Receiver", IEEE Transactions on Circuits and Systems—II: Express Briefs, vol. 59, No. 1, Jan. 2012.

* cited by examiner

*Primary Examiner* — Rahel Guarino
(74) *Attorney, Agent, or Firm* — Winston Hsu

(57) ABSTRACT

The present invention provides a transceiver circuit, which includes a receiving circuit and a digital circuit, and the receiving circuit includes a first mixer, a second mixer, a bias voltage circuit, a complex filter and an ADC. In the operation of the transceiver circuit, the digital circuit controls the bias voltage circuit to sequentially switch the first bias voltage to a plurality of first bias values, and the receiving circuit generates a plurality of first digital signals respectively corresponding to the plurality of first bias values, wherein the plurality of first digital signals are used to calculate a plurality of first quality parameters respectively corresponding to the first bias values. The digital circuit controls the bias voltage circuit so that the first bias voltage has the first bias value corresponding to an optimal quality parameter, wherein the optimal quality parameter is determined according to the plurality of first quality parameters.

11 Claims, 7 Drawing Sheets

TRANSCEIVER CIRCUIT AND ASSOCIATED CONTROL METHOD

BACKGROUND OF THE INVENTION

1. Field of the Invention

The present invention relates to a transceiver circuit and associated control method.

2. Description of the Prior Art

The low-intermediate frequency receiver (low-IF receiver) has been widely used in many electronic devices. In order to achieve a better image rejection ratio (IMRR), the low-IF receiver generally has two channels, in-phase channel and quadrature channel, and a complex filter. In addition, in order to calibrate the gain and phase and corresponding impedance matching in the receiver, multiple adjustable resistors will need to be set in the complex filter, but this will increase the complexity of the resistor network and also increase the chip area.

SUMMARY OF THE INVENTION

It is therefore an objective of the present invention to provide a transceiver circuit, which can maintain a better IMRR under a low-current design by adjusting the bias voltage of the mixer, so that the complex filter does not need to use complex resistor networks, to solve the problems of the prior art.

According to one embodiment of the present invention, a transceiver circuit comprising a receiving circuit and a digital circuit is disclosed. The receiving circuit comprises a first mixer, a second mixer, a bias circuit, a complex filter and an ADC. The first mixer is configured to use a first oscillation signal to perform a mixing operation on an input signal to generate a first mixed signal. The second mixer is configured to use a second oscillation signal to perform the mixing operation on the input signal to generate a second mixed signal. The bias circuit is configured to generate a first bias voltage to the first mixer, and generate a second bias voltage to the second mixer. The complex filter is configured to generate a first IF signal and a second IF signal according to the first mixed signal and the second mixed signal. The ADC is configured to perform an analog-to-digital conversion operation on an output IF signal to generate a digital signal, wherein the output IF signal is one of the first IF signal and the second IF signal. The digital circuit is coupled to the receiving circuit, wherein the digital circuit controls the bias circuit to sequentially switch the first bias voltage to a plurality of first bias values, and the receiving circuit generates a plurality of first digital signals respectively corresponding to the plurality of first bias values, and the digital circuit calculates a plurality of first quality parameters respectively corresponding to the plurality of first bias values; and the digital circuit controls the bias circuit to make the first bias voltage have the first bias value that is corresponding to an optimal quality parameter, wherein the optimal quality parameter is determined by at least one of the plurality of first quality parameters.

According to one embodiment of the present invention, a control method of a transceiver circuit is disclosed, wherein the transceiver circuit comprises a receiving circuit, and the receiving circuit comprises a first mixer, a second mixer, a bias circuit, a complex filter and an ADC. The first mixer is configured to use a first oscillation signal to perform a mixing operation on an input signal to generate a first mixed signal. The second mixer is configured to use a second oscillation signal to perform the mixing operation on the input signal to generate a second mixed signal. The bias circuit is configured to generate a first bias voltage to the first mixer, and generate a second bias voltage to the second mixer. The complex filter is configured to generate a first IF signal and a second IF signal according to the first mixed signal and the second mixed signal. The ADC is configured to perform an analog-to-digital conversion operation on an output IF signal to generate a digital signal, wherein the output IF signal is one of the first IF signal and the second IF signal. The control method comprises: controlling the bias circuit to sequentially switch the first bias voltage to a plurality of first bias values, for the receiving circuit to generate a plurality of first digital signals respectively corresponding to the plurality of first bias values; calculating a plurality of first quality parameters respectively corresponding to the plurality of first bias values; and controlling the bias circuit to make the first bias voltage have the first bias value that is corresponding to an optimal quality parameter, wherein the optimal quality parameter is determined by at least one of the plurality of first quality parameters.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
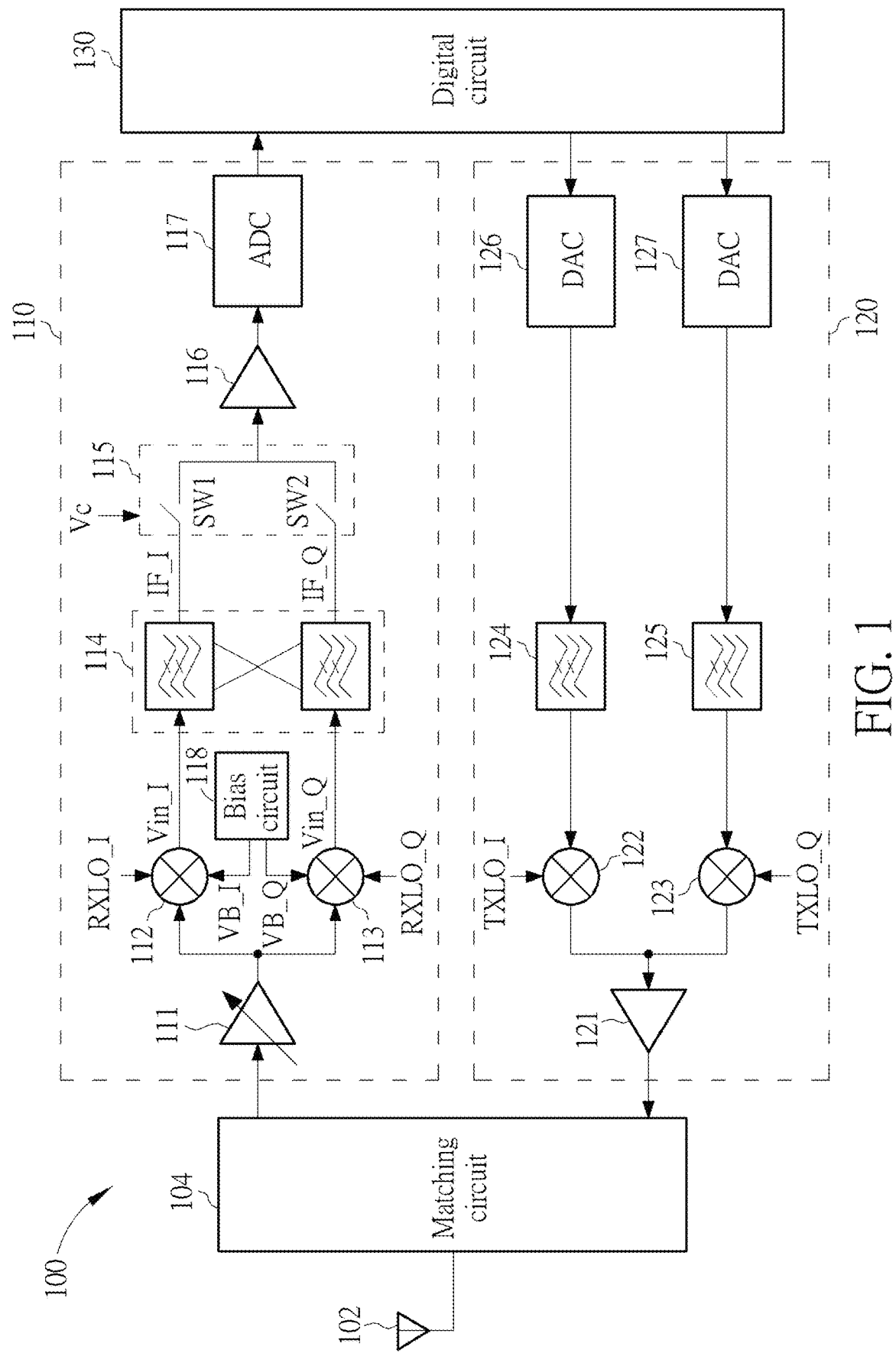
FIG. 1 is a diagram illustrating a transceiver circuit according to one embodiment of the present invention.

FIG. 1 is a diagram illustrating a transceiver circuit 100 according to one embodiment of the present invention. As shown in FIG. 1, the transceiver circuit 100 comprises a receiving circuit 110, a transmitting circuit 120 and a digital circuit 130. The receiving circuit 110 comprises a low-noise amplifier 111, two mixers 112 and 113, a complex filter 114, a switch module 115, a programmable gain amplifier (PGA) 116, an analog-to-digital converter (ADC) 117 and a bias circuit 118, wherein the switch module 115 comprises two switches SW1 and SW2. The transmitting circuit 120 comprises a power amplifier 121, two mixers 122 and 123, two filters 124 and 125, and two digital-to-analog converters (DAC) 126 and 127. In this embodiment, the receiving circuit 110 and the transmitting circuit 120 are connected to an antenna 102 through a matching circuit 104 to receive and transmit signals. In addition, in this embodiment, the receiving circuit 110 is a low-IF receiving circuit.

In the operation of the receiving circuit 110, the low-noise amplifier 111 receives a received signal from the antenna 102 through the matching circuit 104, and processes the received signal to generate an input signal. Then, the mixer 112 uses an oscillation signal RXLO_I to perform a mixing operation on the input signal to generate a mixed signal Vin_I, and the mixer 114 uses an oscillation signal RXLO_Q to perform the mixing operation on the input signal to generate a mixed signal Vin_Q, wherein the oscillation signal RXLO_Q and the oscillation signal RXLO_I have the same frequency and a phase difference of 90 degrees, that is, the mixed signal Vin_I corresponds to an in-phase channel, and the mixed signal Vin_Q corresponds to a quadrature channel. Then, the complex filter 114 receives the mixed signals Vin_I and Vin_Q to generate intermediate frequency (IF) signals IF_I and IF_Q, wherein the IF signal IF_I corresponds to the in-phase channel, and the IF signal IF_Q corresponds to the quadrature channel. In addition, since the operation of the complex filter 114 requires the use of signals from the in-phase channel and the quadrature channel at the same time, the complex filter 114 generates the IF signal IF_I according to the mixed signals Vin_I and Vin_Q, and generates the IF signal IF_Q according to the mixed signals Vin_I and Vin_Q. Since the complex filter 114 is well known to a person skilled in the art, its detailed circuit structure will not be described in detail here. Then, the switch module 115 receives the IF signals IF_I and IF_Q, and selects one of the IF signals IF_I and IF_Q as an output IF signal according to a control signal Vc. Specifically, when the control signal Vc indicates that the IF signal IF_I is to be outputted, the switch module 115 enables the switch SW1 and disables the switch SW2 to output the IF signal IF_I; and when the control signal Vc indicates that the IF signal IF_Q is to be outputted, the switch module 115 enables the switch SW2 and disables the switch SW1 to output the IF signal IF_Q. Then, the PGA 116 amplifies the output IF signal to generate an amplified IF signal, and the ADC 117 performs an analog-to-digital conversion operation on the amplified IF signal to generate a digital signal, for the digital circuit 130 to perform subsequent processing.

In the operation of the receiving circuit 110, since the switch module 115 selects only one of the IF signals IF_I and IF_Q as the output IF signal, the receiving circuit 110 only needs to set one PGA 116 and one ADC 117 to process the IF signal IF_I or the IF signal IF_Q, and it is not necessary to have two sets of circuits to process the IF signals IF_I and IF_Q at the same time as in the prior art. Therefore, the receiving circuit 110 of this embodiment can indeed reduce the chip area and power consumption.

However, the circuits and signals in the in-phase channel and the quadrature channel in the receiving circuit 110 do not completely match, for example, the phase difference of the oscillation signals RXLO_I and RXLO_Q is not exactly 90 degrees, and the gains of different paths will not be completely matched. Therefore, the responses of the complex filter 114 on the in-phase channel and the quadrature channel will be inconsistent, thus causing the IF signals IF_I and IF_Q to have different signal qualities. As mentioned above, in order to allow the receiving circuit 110 to generate a better digital signal to the digital circuit 130 and reduce the design complexity of the complex filter 114, this embodiment additionally proposes a method for adjusting the bias voltage of the mixer 112 and 113 and automatically determine which one of the IF signals IF_I and IF_Q has better signal quality, and control the switch module 115 to select the IF signal with better signal quality from the IF signals IF_I and IF_Q.

Figure 2:
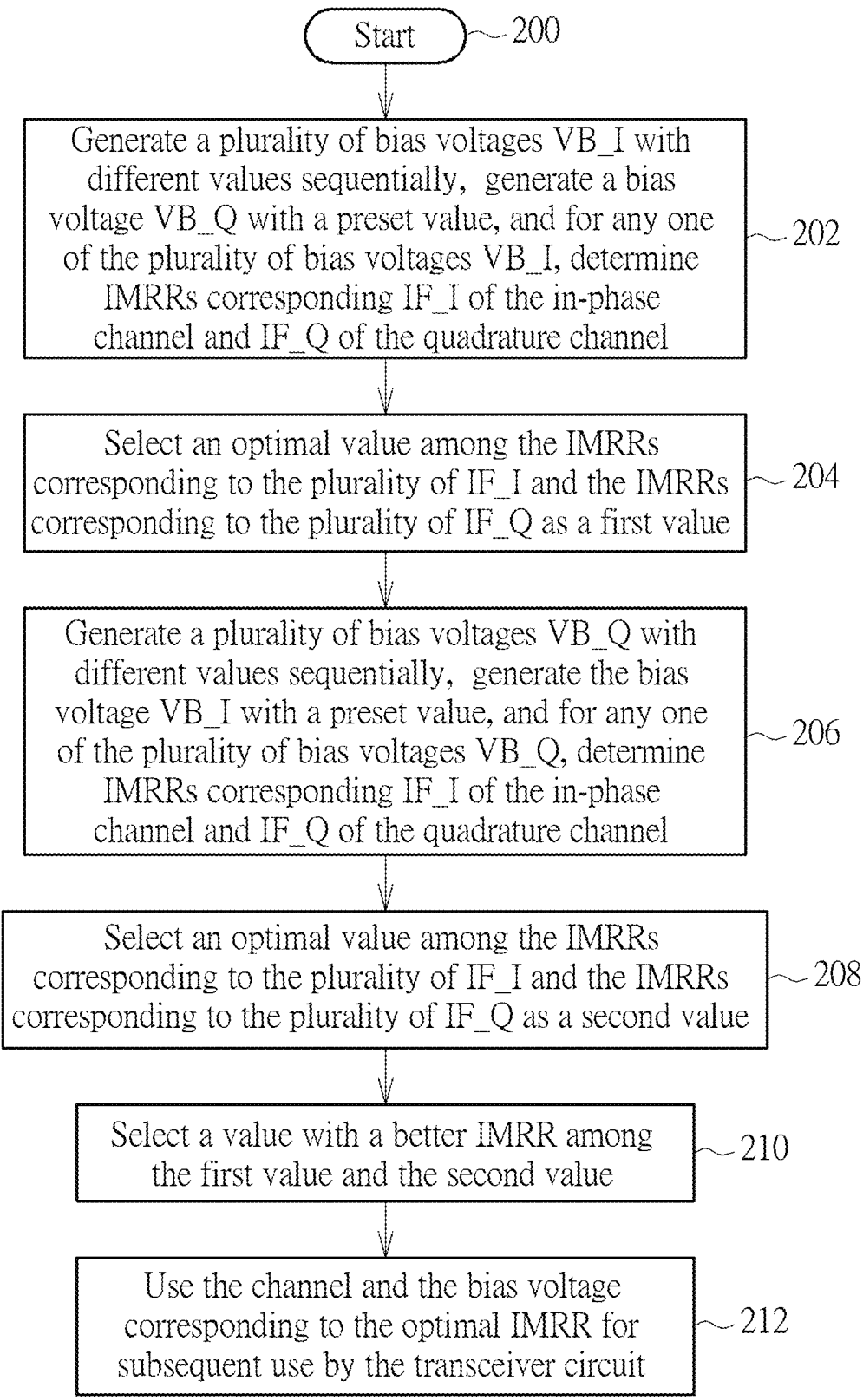
FIG. 2 is a flowchart of control method of the transceiver circuit according to one embedment of the present invention.
Figure 3:
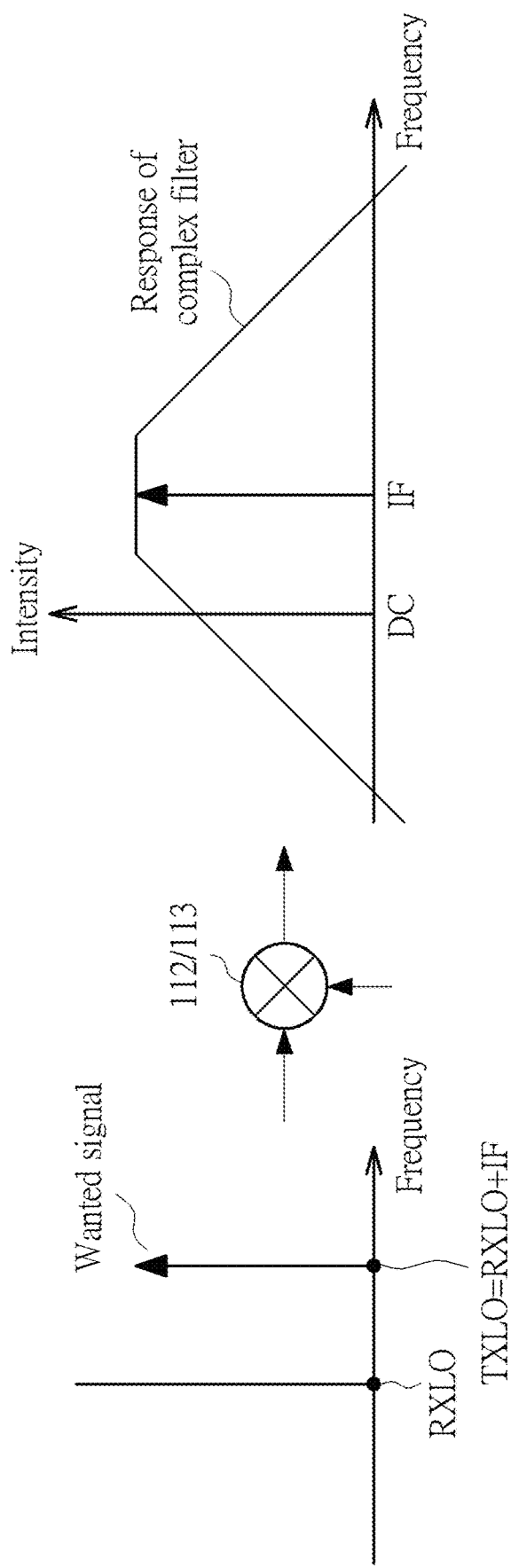
FIG. 3 is a diagram of a wanted signal after being processed by the mixer and complex filter.

FIG. 2 is a flowchart of control method of the transceiver circuit 100 according to one embedment of the present invention. In Step 200, the flow starts, and the transceiver circuit 100 is powered on and starts operating. In Step 202, the bias circuit 118 is controlled to sequentially generate a plurality of bias voltages VB_I with different values to the mixer 112, and generate a bias voltage VB_Q with a preset value to the mixer 113. In addition, for any one of the bias voltages VB_I, the digital circuit 130 will determine the IMRR (i. e., corresponding to a quality parameter) of the IF signal IF_I of the in-phase channel and the IF signal IF_Q of the quadrature channel. Specifically, for any one of the bias voltages VB_I, refer to FIG. 1, FIG. 3 and FIG. 4 together, firstly, the digital circuit 130 generates two digital signals to the DACs 126 and 127, respectively, to generate two analog signals. Then, the two analog signals are processed by the filters 124 and 125 to generate a first filtered signal and a second filtered signal, respectively, and the mixer 122 uses an oscillation signal TXLO_I to perform a mixing operation on the first filtered signal to generate a first mixed signal, and the mixer 123 uses an oscillation signal TXLO_Q to perform the mixing operation on the second filtered signal to generate a second mixed signal, wherein the oscillation signal TXLO_Q and the oscillation signal TXLO_I have the same frequency and a phase difference of 90 degrees. Then, the first mixed signal and the second mixed signal are combined and processed by the power amplifier 121 to generate a first test signal to the matching circuit 104. In this embodiment, the first test signal is used to represent a wanted signal at this time, and the frequency difference between the oscillation signal TXLO_I/TXLO_Q and the oscillation signal RXLO_I/RXLO_Q is "IF" as shown in FIG. 3. In addition, FIG. 3 uses "TXLO" to represent the frequency of the oscillation signal TXLO_I/ TXLO_Q, and uses "RXLO" to represent the frequency of the oscillation signal RXLO_I/RXLO_Q. In addition, the frequency of the wanted signal is located in the in-band frequency of the complex filter 114.

Then, the receiving circuit 110 receives the first test signal generated by the transmitting circuit 120 through the matching circuit 104, and processes the first test signal as a received signal. At this time, the digital circuit 130 can first generate the control signal Vc to control the switch module 115 to select the IF signal IF_I. As shown in FIG. 3, after being processed by the mixer 112/113 and the complex filter 114, the IF signals IF_I and IF_Q comprises components corresponding to the frequency "IF", where the IF signals IF_I and IF_Q are close to the direct current "DC". It should be noted that the response of the complex filter 114 shown in FIG. 3 is an ideal state, but in the actual state the response of the complex filter 114 is not completely symmetrical due to the mismatch between the in-phase channel and the quadrature channel. Then, since the switch module 115 has been controlled to output the IF signal IF_I, the PGA 116 and the ADC 117 process the IF signal IF_I to generate a digital signal to the digital circuit 130, for the digital circuit 130 determines the intensity of the IF signal IF_I with the wanted signal.

Figure 4:
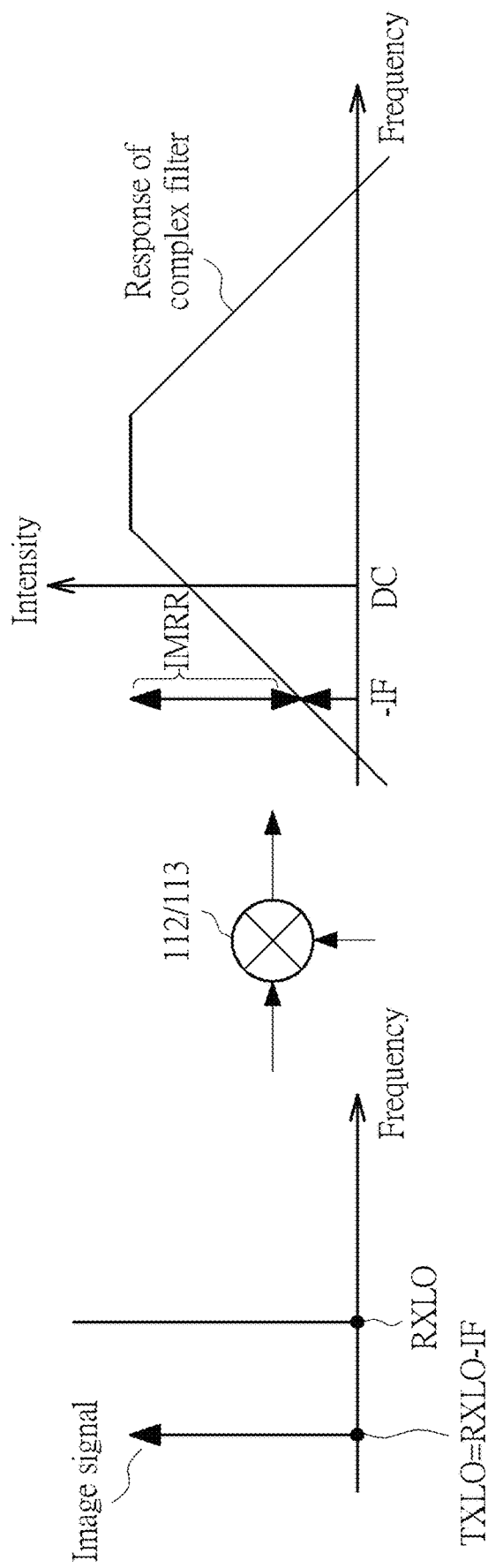
FIG. 4 is a diagram of an image signal after being processed by the mixer and complex filter.

Next, the digital circuit 130 generates two digital signals to the transmitting circuit 120 again, and the transmitting circuit 120 performs similar operations to generate a second test signal to the matching circuit 104. Referring to FIG. 4, in this embodiment, the second test signal is used to represent an image signal at this time, and the frequency difference between the oscillation signal TXLO_I/TXLO_Q and the oscillation signal RXLO_I/RXLO_Q is "IF" as shown in FIG. 4. That is, if the frequency TXLO of the first test signal shown in FIG. 3 is "RXLO+IF", the frequency TXLO of the second test signal shown in FIG. 4 is "RXLO-IF".

Then, the receiving circuit 110 receives the second test signal generated by the transmitting circuit 120 through the matching circuit 104, and processes the second test signal as the received signal. At this time, the digital circuit 130 can generate the control signal Vc to control the switch module 115 to select the IF signal IF_I. As shown in FIG. 4, after being processed by the mixer 112/113 and the complex filter 114, the IF signals IF_I and IF_Q comprises components corresponding to the frequency "−IF". In addition, since the switch module 115 has been controlled to output the IF signal IF_I, the PGA 116 and the ADC 117 process the IF signal IF_I to generate a digital signal to the digital circuit 130, for the digital circuit 130 determines the intensity of the IF signal IF_I with the image signal.

As mentioned above, since the digital circuit 130 determines the intensity of the wanted signal and the intensity of the image signal, the IMRR of the IF signal IF_I can be calculated. The calculation of the IMRR can refer to FIG. 4, that is, the degree to which the image signal is attenuated after passing through the complex filter 114, such as the IMRR marked in FIG. 4.

It should be noted that in the embodiments of FIG. 3 and FIG. 4, the frequency of the wanted signal is "RXLO+IF" and the frequency of the image signal is "RXLO-IF", but it's not a limitation of the present invention. In other embodiments, the frequency of the wanted signal may be "RXLO-IF", the frequency of the image signal may be "RXLO+IF", and the center frequency of the complex filter 114 may be located near "RXLO-IF". These alternative designs should fall within the scope of the present invention.

Then, the digital circuit 130 generates two digital signals to the transmitting circuit 120 again, and the transmitting circuit 120 performs similar operations to generate a third signal to the matching circuit 104. In this embodiment, the third test signal is used to represent a wanted signal shown in FIG. 3, and the frequency difference between the oscillation signal TXLO_I/TXLO_Q and the oscillation signal RXLO_I/RXLO_Q is "IF" as shown in FIG. 3.

Then, the receiving circuit 110 receives the third test signal generated by the transmitting circuit 120 through the matching circuit 104, and processes the third test signal as the received signal. At this time, the digital circuit 130 can generate the control signal Vc to control the switch module 115 to select the IF signal IF_Q. As shown in FIG. 3, after being processed by the mixer 112/113 and the complex filter 114, the IF signals IF_I and IF_Q comprises components corresponding to the frequency "IF". In addition, since the switch module 115 has been controlled to output the IF signal IF_Q, the PGA 116 and the ADC 117 process the IF signal IF_Q to generate the digital signal to the digital circuit 130, for the digital circuit 130 determines the intensity of the IF signal IF_Q with the wanted signal.

Then, the digital circuit 130 generates two digital signals to the transmitting circuit 120 again, and the transmitting circuit 120 performs similar operations to generate a fourth signal to the matching circuit 104. In this embodiment, the third test signal is used to represent an image signal shown in FIG. 4, and the frequency difference between the oscillation signal TXLO_I/TXLO_Q and the oscillation signal RXLO_I/RXLO_Q is "−IF" as shown in FIG. 4. That is, if the frequency TXLO of the third test signal shown in FIG. 3 is "RXLO+IF", the frequency TXLO of the fourth test signal shown in FIG. 4 is "RXLO-IF".

Then, the receiving circuit 110 receives the fourth test signal generated by the transmitting circuit 120 through the matching circuit 104, and processes the fourth test signal as the received signal. At this time, the digital circuit 130 can generate the control signal Vc to control the switch module 115 to select the IF signal IF_Q. As shown in FIG. 4, after being processed by the mixer 112/113 and the complex filter 114, the IF signals IF_I and IF_Q comprises components corresponding to the frequency "−IF". In addition, since the switch module 115 has been controlled to output the IF signal IF_Q, the PGA 116 and the ADC 117 process the IF signal IF_Q to generate the digital signal to the digital circuit 130, for the digital circuit 130 determines the intensity of the IF signal IF_Q with the image signal.

As mentioned above, since the digital circuit 130 determines the intensity of the wanted signal and the intensity of the image signal, the IMRR of the IF signal IF_Q can be calculated.

It should be noted that the order of generation and processing of the above-mentioned first test signal, second test signal, third test signal and fourth test signal is not a limitation of the present invention. That is, the order in which the digital circuit 130 determines the intensity of the IF signal IF_I of the wanted signal, the intensity of the IF signal IF_I with the image signal, the intensity of the IF signal IF_Q with the wanted signal, and the intensity of the IF signal IF_Q with the image signal can be changed without affecting the spirit of the present invention.

It should be noted that the above calculation of the IMRR of the IF signals IF_Q and IF_Q is only used as an example and is not a limitation of the present invention. In other embodiments of the present invention, the IMRR can be replaced by any quality parameter that can reflect the attenuation degree of the image signal of the IF signals IF_I and IF_Q.

As mentioned above, in Step 202, if the bias circuit 118 can switch the bias voltage VB_I to N bias values (where N is a positive integer greater than or equal to 2), the IMRRs of the N IF signals IF_I respectively corresponding to the N bias voltages VB_I, and the IMRRs of the N IF signals IF_Q respectively corresponding to the N bias voltages can be generated in Step 202.

In Step 204, the digital circuit 130 selects an optimal value among the IMRRs of the plurality of IF signals IF_I and the IMRRs of the plurality of IF signals IF_Q generated in Step 202 as a first value, and the digital circuit 130 records the first value and the corresponding bias voltage VB_I and the channel (that is, the in-phase channel or the quadrature channel).

In Step 206, the bias circuit 118 is controlled to sequentially generate a plurality of bias voltages VB_Q with different values to the mixer 113, and generate a bias voltage VB_I with a preset value to the mixer 112. For any one of the plurality of bias voltages VB_Q, the digital circuit 130 will determine the IMRR of the IF signal IF_I of the in-phase channel and the IF signal IF_Q of the quadrature channel. That is, if the bias circuit 118 can switch the bias voltage VB_Q to M bias values (where M is a positive integer greater than or equal to 2), the IMRRs of the M IF signals IF_I respectively corresponding to the M bias voltages VB_Q, and the IMRRs of the M IF signals IF_Q respectively corresponding to the M bias voltages VB_Q can be generated in Step 206. Since the detailed operation of step 206 can refer to the content of the above embodiment of Step 202, the detailed operation will not be described again here.

In Step 208, the digital circuit 130 selects an optimal value among the IMRRs of the plurality of IF signals IF_I and the IMRRs of the plurality of IF signals IF_Q generated in Step 206 as a second value, and the digital circuit 130 records the second value and the corresponding bias voltage VB_Q and the channel (that is, the in-phase channel or the quadrature channel).

In Step 210, the digital circuit 130 selects a value with a better IMRR among the first value and the second value.

It should be noted that the above Steps 204, 208, and 210 can be integrated to directly determine the optimal IMRR and the corresponding bias voltages VB_I, VB_Q and channel, without having to first determine the above-mentioned first value and the second value. In other words, the digital circuit 130 can directly determine an optimal IMRR (i.e., the optimal quality parameter) according to the IMRRs of the plurality of IF signals IF_I and the plurality of F signals IF_Q corresponding to different bias voltages VB_I generated in Step 202 (i.e., the plurality of first quality parameters) and the IMRRs of the plurality of IF signals IF_I and the plurality of F signals IF_Q corresponding to different bias voltages VB_Q generated in Step 206 (i.e., the plurality of second quality parameters).

In Step 212, after determining the optimal IMRR, in subsequent operations of the transceiver circuit 100, the digital circuit 130 can control the bias circuit 118 to generate bias voltages VB_I and VB_Q corresponding to the optimal IMRR to the mixers 112 and 113, and can also generate the control signal Vc to control the switch module 115 to select the IF signal corresponding to the optimal IMRR as the output IF signal for being processed by the subsequent PGA 116 and ADC 117.

Figure 5:
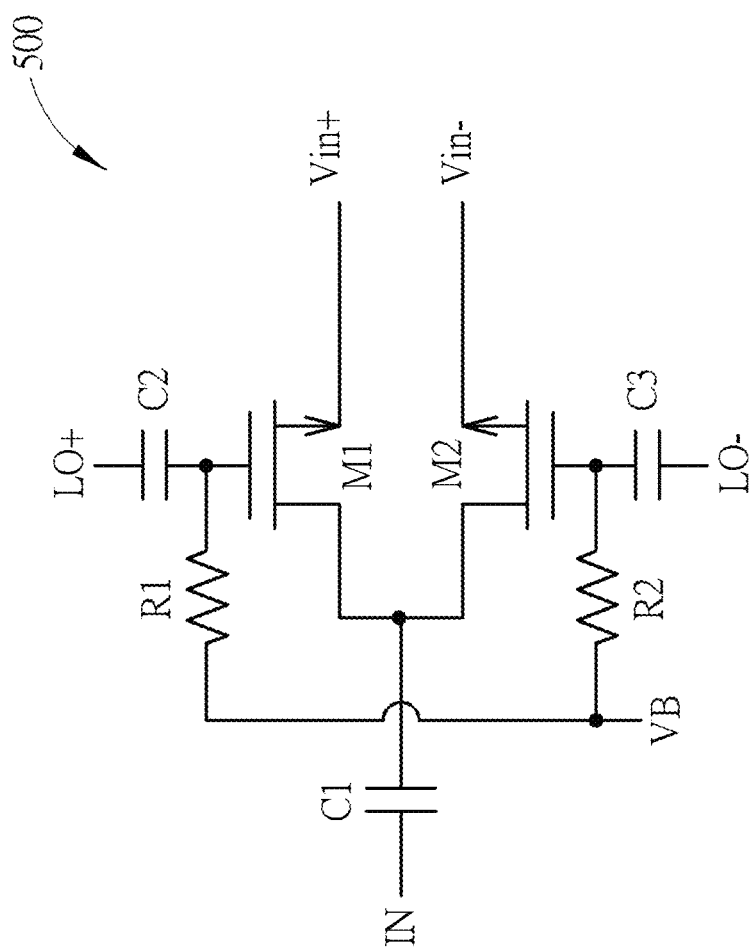
FIG. 5 is a diagram illustrating a mixer according to one embodiment of the present invention.

FIG. 5 is a diagram illustrating a mixer 500 according to one embodiment of the present invention, wherein the mixer 500 can be used to implement the mixers 112 and 113 shown in FIG. 1. As shown in FIG. 5, the mixer 500 comprises capacitors C1, C2 and C3, two resistors R1 and R2, and two transistors M1 and M2. In the operation of the mixer 500, the bias voltage VB is input to the gate electrodes of the transistors M1 and M2 through the resistors R1 and R2, and the transistors M1 and M2 use the oscillation signals LO+ and LO− to perform a mixing operation (frequency downconversion) on an input signal IN to generate a differential mixed signal Vin+ and Vin−. In the embodiment of FIG. 5, LO+ and LO− correspond to RXLO_I or RXLO_Q in FIG. 1, respectively, VB corresponds to VB_I or VB_Q in FIG. 1, and Vint and Vin-correspond to Vin_I or Vin_Q in FIG. 1.

It should be noted that the mixer 500 shown in FIG. 5 is only used as an example and is not a limitation of the present invention. In other embodiments, as long as the bias voltages VB_I and VB_Q generated by the bias circuit 118 are input into the mixer as the bias voltages for the gate electrodes of the transistors, the mixers 112 and 113 in FIG. 1 can use another type of mixer such as single balanced mixer or double balanced mixer.

Figure 6:
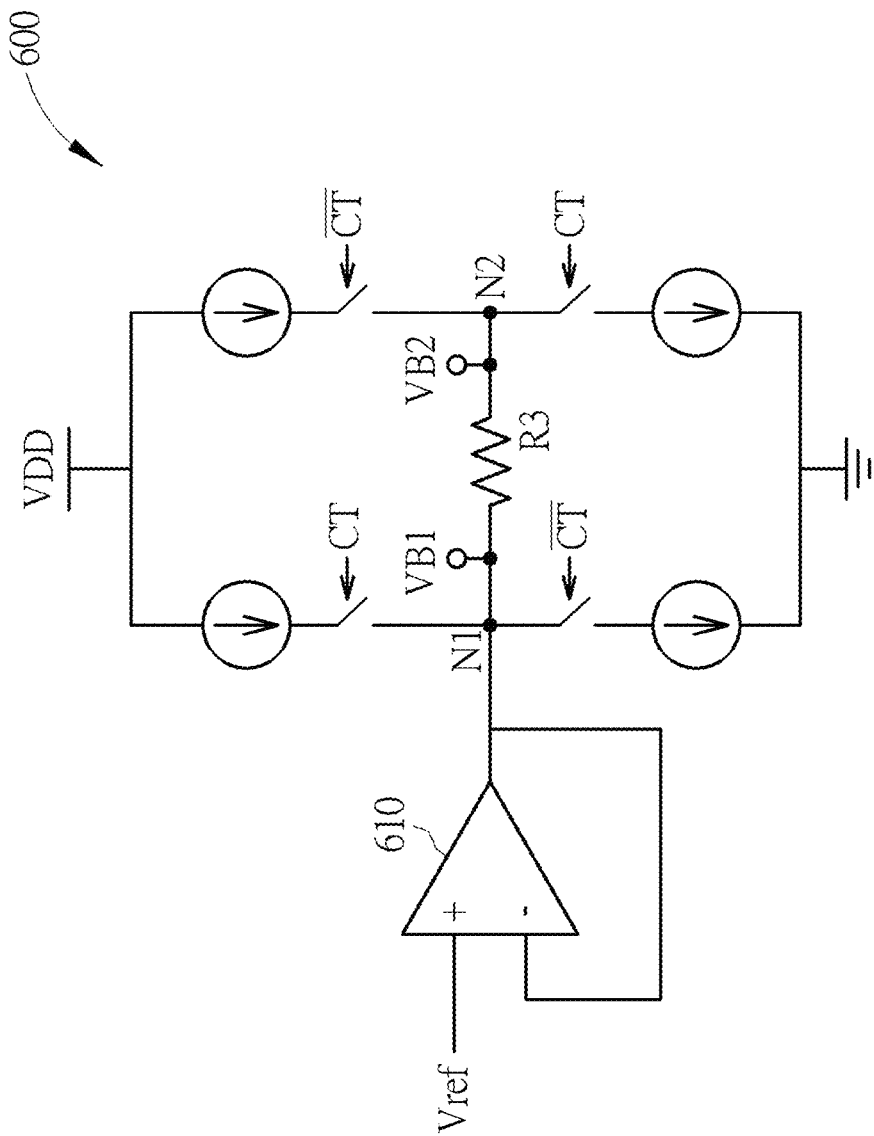
FIG. 6 is a diagram illustrating a bias circuit according to one embodiment of the present invention.

FIG. 6 is a diagram illustrating a bias circuit 600 according to one embodiment of the present invention, wherein the bias circuit 600 can be used to implement the bias circuit 118 shown in FIG. 1. As shown in FIG. 6, the bias circuit 600 comprises an operational amplifier 610, a resistor R3 and four switched current sources, wherein an input terminal of the operational amplifier 610 is connected to a reference voltage Vref, and an output terminal of the operational amplifier is connected to a first terminal N1, and the resistor R3 is coupled between the first terminal N1 and a second terminal N2. The first switched current source is coupled between a supply voltage VDD and the first terminal N1; the second switched current source is coupled between the supply voltage VDD and the second terminal N2; the third switched current source is coupled between a ground voltage and the first terminal N1; and the fourth switched current source is coupled between the ground voltage and the second terminal N2. The four switched current sources are controlled by control signals CT and $\overline{CT}$, respectively. In the operation of the bias circuit 600, the operational amplifier 610 receives the reference voltage Vref, and changes the levels of the bias voltages VB1 and VB2 by changing the levels of the control signals CT, wherein the bias voltage VB1 may be one of the bias voltages VB_I and VB_Q of FIG. 1, and the bias voltage VB2 may be the other one of the bias voltages VB_I and VB_Q of FIG. 1. For example, if the bias voltage VB1 is used as the bias voltage VB_I in FIG. 1, and the bias voltage VB2 is used as the bias voltage VB_Q in FIG. 1, when the control signal CT enables the corresponding switch (for example, CT=1), the bias voltage VB2 will be lower than the bias voltage VB1, causing the bias voltage VB_Q to be lower than the bias voltage VB_I, thereby reducing the gain of the quadrature channel. If the bias voltage VB1 is used as the bias voltage VB_Q in FIG. 1, and the bias voltage VB2 is used as the bias voltage VB_I in FIG. 1, when the control signal CT enables the corresponding switch, the bias voltage VB2 will be lower than the bias voltage VB1, causing the bias voltage VB_I to be lower than the bias voltage VB_Q, thereby reducing the gain of the in-phase channel. If the bias voltage VB1 is used as the bias voltage VB_I in FIG. 1, and the bias voltage VB2 is used as the bias voltage VB_Q in FIG. 1, when the control signal $\overline{CT}$ enables the corresponding switch (for example, CT=0), the bias voltage VB2 will be greater than the bias voltage VB1, thereby increasing the gain of the quadrature channel. If the bias voltage VB1 is used as the bias voltage VB_Q in FIG. 1, and the bias voltage VB2 is used as the bias voltage VB_I in FIG. 1, when the control signal $\overline{CT}$ enables the corresponding switch, the bias voltage VB2 will be greater than the bias voltage VB1, thereby increasing the gain of the in-phase channel. It is noted that the bias circuit 600 shown in FIG. 6 is only used as an example and is not a limitation of the present invention.

Figure 7:
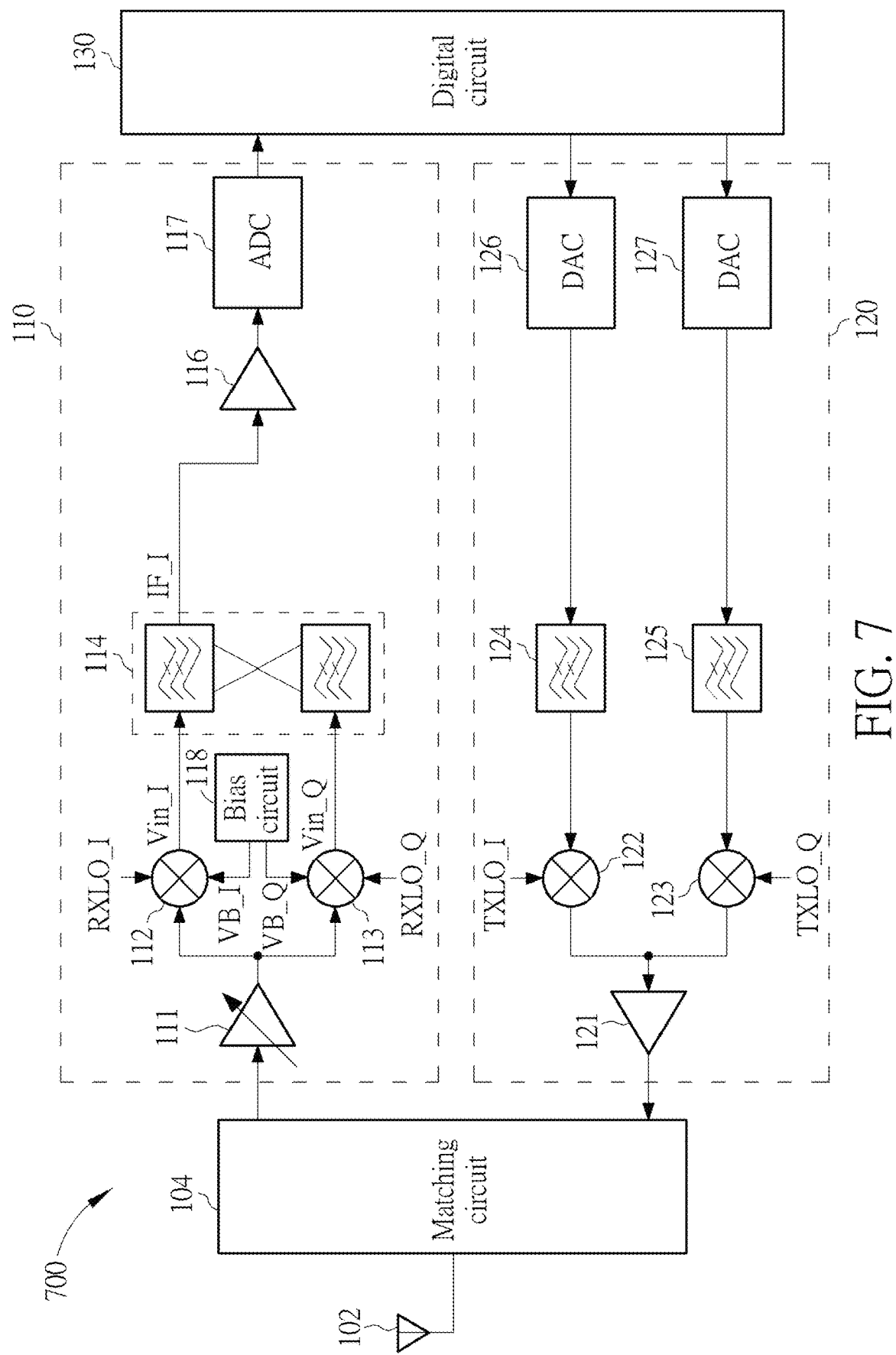
FIG. 7 is a diagram illustrating a transceiver circuit according to one embodiment of the present invention.

In another embodiment of the present invention, the transceiver circuit 100 shown in FIG. 1 can be modified to disconnect the path from the in-phase channel or the quadrature channel to the PGA 116, which can further reduce the chip area to reduce manufacturing costs. Specifically, refer to FIG. 7, which is a diagram illustrating a transceiver circuit 700 according to one embodiment of the present invention. The difference between the transceiver circuit 700 and the transceiver circuit 100 shown in FIG. 1 is that the transceiver circuit 700 does not have a switch module 115, and the PGA 116 only receives the IF signal IF_I generated by the in-phase channel. In the operation of the transceiver circuit 700, it is similar to the embodiment in FIG. 2, but since the PGA 116 only receives the IF signal IF_I generated by the in-phase channel, only IMRRs corresponding to the plurality of IF signals IF_I corresponding to the plurality of bias voltages VB_I will be generated in Step 202, and only IMRRs corresponding to the plurality of IF signals IF_I corresponding to the plurality of bias voltages VB_Q will be generated in Step 206. Since a person skilled in the art should be able to understand the operation of the transceiver circuit 700 after reading the embodiments in FIG. 1-FIG. 4, other details will not be described here.

In another embodiment of the present invention, the PGA 116 of the transceiver circuit 700 only receives the IF signal IF_Q generated by the quadrature channel, so only IMRRs corresponding to the plurality of IF signals IF_Q corresponding to the plurality of bias voltages VB_I will be generated in Step 202, and only IMRRs corresponding to the plurality of IF signals IF_Q corresponding to the plurality of bias voltages VB_Q will be generated in Step 206. This alternative design shall fall within the scope of the present invention.

In one embodiment of the present invention, the bias voltage VB_I or the bias voltage VB_Q generated by the bias circuit 118 of the transceiver circuit 700 can be a fixed value without being able to switch to different bias values. For example, the bias voltage VB_Q generated by the bias circuit 118 can be a fixed value, and at this time, Steps 206, 208, and 210 in FIG. 2 can be removed. That is, the digital circuit 130 directly selects the optimal IMRR (i.e., the optimal quality parameter) from the IMRRs (i.e., the plurality of first quality parameters) corresponding to the plurality of IF signals IF_I generated in Step 202, for use in Step 212.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transceiver circuit, comprising:
 a receiving circuit, wherein the receiving circuit comprises:
  a first mixer, configured to use a first oscillation signal to perform a mixing operation on an input signal to generate a first mixed signal;
  a second mixer, configured to use a second oscillation signal to perform the mixing operation on the input signal to generate a second mixed signal;
  a bias circuit, configured to generate a first bias voltage to the first mixer, and generate a second bias voltage to the second mixer;
  a complex filter, configured to generate a first intermediate frequency (IF) signal and a second IF signal according to the first mixed signal and the second mixed signal; and
  an analog-to-digital converter (ADC), configured to perform an analog-to-digital conversion operation on an output IF signal to generate a digital signal, wherein the output IF signal is one of the first IF signal and the second IF signal; and
 a digital circuit, coupled to the receiving circuit, wherein the digital circuit controls the bias circuit to sequentially switch the first bias voltage to a plurality of first bias values, and the receiving circuit generates a plurality of first digital signals respectively corresponding to the plurality of first bias values, and the digital circuit calculates a plurality of first quality parameters respectively corresponding to the plurality of first bias values; and the digital circuit controls the bias circuit to make the first bias voltage have a first bias value that is corresponding to an optimal quality parameter, wherein the optimal quality parameter is determined by at least one of the plurality of first quality parameters.

2. The transceiver circuit of claim 1, wherein the digital circuit further controls the bias circuit to sequentially switch the second bias voltage to a plurality of second bias values, and the receiving circuit generates a plurality of second digital signals respectively corresponding to the plurality of second bias values, and the digital circuit calculates a plurality of second quality parameters respectively corresponding to the plurality of second bias values; and the digital circuit selects the optimal quality parameter from the plurality of first quality parameters and the plurality of second quality parameters.

3. The transceiver circuit of claim 1, wherein the receiving circuit further comprises:
 a switch module, configured to receive the first IF signal and the second IF signal, and to select one of the first IF signal and the second IF signal according to a control signal to generate the output IF signal;
 wherein the digital circuit generates the control signal to sequentially select one of the first IF signal and the second IF signal as the output IF signal; and for using any one of the first IF signal and the second IF signal as the output IF signal, the digital circuit controls the bias circuit to sequentially switch the first bias voltage to the plurality of first bias values, so that the plurality of first quality parameters comprise a quality parameter corresponding to the first IF signal and a quality parameter corresponding to the second IF signal.

4. The transceiver circuit of claim 3, wherein the digital circuit further controls the bias circuit to sequentially switch the second bias voltage to a plurality of second bias values, and the receiving circuit generates a plurality of second digital signals respectively corresponding to the plurality of second bias values, and the digital circuit calculates a plurality of second quality parameters respectively corresponding to the plurality of second bias values; and the digital circuit selects the optimal quality parameter from the plurality of first quality parameters and the plurality of second quality parameters.

5. The transceiver circuit of claim 4, wherein for using any one of the first IF signal and the second IF signal as the output IF signal, the digital circuit controls the bias circuit to sequentially switch the second bias voltage to the plurality of second bias values, so that the plurality of second quality parameters comprise the quality parameter corresponding to the first IF signal and the quality parameter corresponding to the second IF signal.

6. The transceiver circuit of claim 1, wherein each of the plurality of first quality parameters is an image rejection ratio (IMRR).

7. The transceiver circuit of claim 1, wherein the first mixer comprises at least one transistor, and the bias circuit generates the first bias voltage to a gate electrode of the at least one transistor of the first mixer.

8. The transceiver circuit of claim 1, wherein the bias circuit comprises:
 an operational amplifier, wherein an input terminal of the operational amplifier is coupled to a reference voltage, and an output terminal of the operational amplifier is coupled to a first terminal;
 a resistor, coupled between the first terminal and a second terminal;
 a first switched current source, coupled between a supply voltage and the first terminal;
 a second switched current source, coupled between the supply voltage and the second terminal;
 a third switched current source, coupled between a ground voltage and the first terminal; and
 a fourth switched current source, coupled between the ground voltage and the second terminal;
 wherein the first terminal or the second terminal is used to generate the first bias voltage.

9. A control method of a transceiver circuit, wherein the transceiver circuit comprises:
 a receiving circuit, wherein the receiving circuit comprises:

a first mixer, configured to use a first oscillation signal to perform a mixing operation on an input signal to generate a first mixed signal;

a second mixer, configured to use a second oscillation signal to perform the mixing operation on the input signal to generate a second mixed signal;

a bias circuit, configured to generate a first bias voltage to the first mixer, and generate a second bias voltage to the second mixer;

a complex filter, configured to generate a first intermediate frequency (IF) signal and a second IF signal according to the first mixed signal and the second mixed signal; and an analog-to-digital converter (ADC), configured to perform an analog-to-digital conversion operation on an output IF signal to generate a digital signal, wherein the output IF signal is one of the first IF signal and the second IF signal; and wherein the control method comprises:

controlling the bias circuit to sequentially switch the first bias voltage to a plurality of first bias values, for the receiving circuit to generate a plurality of first digital signals respectively corresponding to the plurality of first bias values;

calculating a plurality of first quality parameters respectively corresponding to the plurality of first bias values; and controlling the bias circuit to make the first bias voltage have a first bias value that is corresponding to an optimal quality parameter, wherein the optimal quality parameter is determined by at least one of the plurality of first quality parameters.

10. The control method of claim 9, further comprising:

controlling the bias circuit to sequentially switch the second bias voltage to a plurality of second bias values, for the receiving circuit to generate a plurality of second digital signals respectively corresponding to the plurality of second bias values;

calculating a plurality of second quality parameters respectively corresponding to the plurality of second bias values; and selecting the optimal quality parameter from the plurality of first quality parameters and the plurality of second quality parameters.

11. The control method of claim 9, wherein the receiving circuit further comprises:

a switch module, configured to receive the first IF signal and the second IF signal, and to select one of the first IF signal and the second IF signal according to a control signal to generate the output IF signal; and the control method further comprises:

generating the control signal to sequentially select one of the first IF signal and the second IF signal as the output IF signal; and for using any one of the first IF signal and the second IF signal as the output IF signal, controlling the bias circuit to sequentially switch the first bias voltage to the plurality of first bias values, so that the plurality of first quality parameters comprise a quality parameter corresponding to the first IF signal and a quality parameter corresponding to the second IF signal.

* * * * *